United States Patent
Dainez et al.

(10) Patent No.: US 6,838,840 B1
(45) Date of Patent: Jan. 4, 2005

(54) METHOD FOR CONTROLLING AND PROTECTING ELECTRIC MOTORS, A SYSTEM FOR CONTROLLING ELECTRIC MOTORS AND AN ELECTRIC MOTOR SYSTEM

(75) Inventors: Paulo Sergio Dainez, Joinville (BR); Luiz Von Dokonal, Joinville (BR); Marcos Guilherme Schwarz, Joinville (BR)

(73) Assignee: Empresa Brasileira de Compressores, S.A., Joinvill (BR)

( * ) Notice: Subject to any disclaimer, the term of this patent is extended or adjusted under 35 U.S.C. 154(b) by 0 days.

(21) Appl. No.: 10/088,233
(22) PCT Filed: Sep. 20, 2000
(86) PCT No.: PCT/BR00/00105
§ 371 (c)(1),
(2), (4) Date: Jul. 11, 2002
(87) PCT Pub. No.: WO01/22566
PCT Pub. Date: Mar. 29, 2001

(30) Foreign Application Priority Data

Sep. 20, 1999 (BR) .............................................. 9904253

(51) Int. Cl.[7] .............................................. H02P 1/18
(52) U.S. Cl. ........................ 318/254; 318/138; 318/439
(58) Field of Search ................................ 318/254, 138, 318/439, 685, 696

(56) References Cited

U.S. PATENT DOCUMENTS

| | | | | |
|---|---|---|---|---|
| 3,931,555 A | * | 1/1976 | Dohanich, Jr. et al. | 318/314 |
| 4,074,179 A | * | 2/1978 | Kuo et al. | 318/696 |
| 4,215,300 A | * | 7/1980 | Schmidt | 318/603 |
| 4,215,302 A | * | 7/1980 | Chiang | 318/696 |
| 4,465,959 A | * | 8/1984 | Yajima | 318/696 |
| 4,532,461 A | | 7/1985 | Crook | 318/254 |

FOREIGN PATENT DOCUMENTS

| | | |
|---|---|---|
| BR | PI 8805485 | 6/1990 |
| JP | 9-261991 | 10/1997 |

* cited by examiner

Primary Examiner—Rina Duda
(74) Attorney, Agent, or Firm—Smith, Gambrell & Russell LLP

(57) ABSTRACT

A method for controlling and protecting electric motors, specially permanent magnet motors electronically actuated by a control system. The system includes a three-phase inverting bridge, in which the position of the rotor can be monitored by using a position detector physically attached to the axle or through the tension induced in the coils by the magnet, in order to correctly control actuation by the control system. The present invention is also directed to a system for controlling electric motors and an electric motor system. The system includes continuously reading the position detector until a minimum expected time has passed. After the minimum expected time has passed, there is continuous reading of the position detector until a maximum expected time has passed to detect if a position change of the rotor is sensed.

12 Claims, 3 Drawing Sheets

| POSITION N. | INLET | | | CURRENT / PI | OUTLET | | | | | |
|---|---|---|---|---|---|---|---|---|---|---|
| | POSITION DETECTOR | | | | SWITCH ACTUATION | | | | | |
| | SA | SB | SC | | T6' | T5' | T4' | T3' | T2' | T1' |
| P1 | 1 | 0 | 1 | 0 | 0 | 0 | 1 | 0 | 0 | 1 |
| P2 | 1 | 0 | 0 | 0 | 1 | 0 | 0 | 0 | 0 | 1 |
| P3 | 1 | 1 | 0 | 0 | 1 | 0 | 0 | 1 | 0 | 0 |
| P4 | 0 | 1 | 0 | 0 | 0 | 0 | 0 | 1 | 1 | 0 |
| P5 | 0 | 1 | 1 | 0 | 0 | 1 | 0 | 0 | 1 | 0 |
| P6 | 0 | 0 | 1 | 0 | 0 | 1 | 1 | 0 | 0 | 0 |
| X | X | X | X | 1 | 0 | 0 | 0 | 0 | 0 | 0 |

Fig. 3

METHOD FOR CONTROLLING AND PROTECTING ELECTRIC MOTORS, A SYSTEM FOR CONTROLLING ELECTRIC MOTORS AND AN ELECTRIC MOTOR SYSTEM

DISCLOSURE OF THE INVENTION

The present invention is directed to a method for controlling and protecting electric motors, specially permanent magnet motors electronically actuated by a control system comprising a three-phase inverting bridge, in which it is required to monitor the position of the rotor by using a position detector physically attached to the axle or through the tension induced in the coils by the magnet, in order to correctly control actuation by the control system. The present invention is also directed to a system for controlling electric motors and an electric motor system.

The objective of the present invention is to prevent one or more switches of the three-phase inverting bridge from being actuated at an improper time, what can lead to the generation of high currents which cannot be detected by the current detector, said currents may cause the auto-demagnetization of the rotor magnet, besides causing damages to the switches of said inverting bridge.

DESCRIPTION OF THE STATE OF THE ART

The detection of the rotor position is required for the actuation of permanent magnet motors.

In accordance with the prior art to the present invention, such detection can be accomplished through sensors physically connected to the rotor ("hall", optical type, and the like) or by observing the voltages induced in the motor coils themselves, as described in Brazilian Patent Application PI 8805485, in such a way that the control may correctly select which phases of the motor will be activated every time.

As described in more details below, the control unit, when normally operating, analyzes the input of the position detector and current protection detector, thus activating the respective outputs in accordance with a predetermined table. However, if there is a failure in the position detector, it is likely that one or more switches of the three-phase inverting bridge is unduly activated, the result of which can be the generation of high currents that are not detected by the current detector, thus resulting in the auto-demagnetization of the motor magnet and damages to the switches of the three-phase inverting bridge.

As known, the demagnetization of the magnet makes it difficult to start the motor, decreases the output and overheats the motor, being inadmissible in all the cases.

Still according to the prior art to this invention, the following measures to prevent the auto-demagnetization of the motor magnet are adopted: the design of a more robust motor, with an increased magnet thickness, what would increase notably the cost, specially in view of a larger magnet; the installation of a current protection detector in every switch or every phase of the motor, what would not only increase the cost but also the complexity of the system, by virtue of the higher number of detectors and signals for the control to analyze; or the simple elimination of the protection against auto-demagnetization, thus placing the integrity of the motor under the statistical possibility of the occurrence of a failure, what represents a serious risk not only for the system, but also for the image of the manufacturer.

BRIEF DESCRIPTION AND OBJECTS OF THE INVENTION

After a number of investigations, it was evidenced that, when normally operating and following the same rotation direction, the sequence where the positions of the rotor are updated in the sensor is always the same. Thus, such sequence can be predetermined, whereby the control unit of the system for controlling an motor could foresee the sequence where the positions of the rotor will be changed. By knowing the speed the motor is rotating at, it is possible to foresee the time when the position of the rotor will be changed.

With these information, the control unit can prevent failures when the motor is actuated, thus assuring the integrity of the rotor magnet and the inverting bridge switches.

In accordance with the teachings of the present invention, the control unit will accept only the position foreseen for the applicable rotation direction as valid, and always at the time expected for the present speed.

Preferably, when determining this time, a tolerance range defining a minimum time and a maximum time, during which a change in the position should take place, should be considered.

The present invention has the advantages, compared to the prior art, that it is not necessary to any oversize the rotor magnet, the cost and the complexity of the motor are decreased, and the current protection detector is simplified, besides conferring a greater reliability to the system.

Such advantages are attained through a method for controlling and protecting electric motors provided with a rotor, specially permanent magnet motors electronically actuated by a control system comprising a three-phase inverting bridge, characterized by comprising the step of counting a first period of time, during which said rotor should be between an original position and the next position, and the step of counting a second period of time that follows said the first period of time, during which said rotor should pass through said next position.

The present invention is also expressed as a system for controlling an electric motor provided with a rotor, specially a permanent magnet motor, comprising a three-phase inverted bridge and characterized by being additionally comprised of a microcontroller capable of analyzing the positions of the rotor as a function of the time, associated with a counter capable of carrying out the step of counting a first period of time, during which said rotor should be between an original position and the next position, and the step of counting a second period of time subsequent said first period of time, during which said rotor should pass through said next position, as well as an electric motor system comprising a control system, an electric motor electronically actuated by the control system, and characterized by being additionally comprised of a microcontroller capable of analyzing the positions of the rotor as a function of the time, associated with a counter capable of carrying out the step of counting a first period of time, during which said rotor should be between an original position and the next position, and the step of counting a second period of time that follows said first period of time, during which said rotor should pass through said next position.

BRIEF DESCRIPTION OF THE DRAWING

The present invention will be described below in more details with reference to the accompanying drawings, wherein:

FIG. 3 is a three-phase inverting bridge actuation table; and

DETAILED DESCRIPTION OF THE INVENTION

Figure 1:
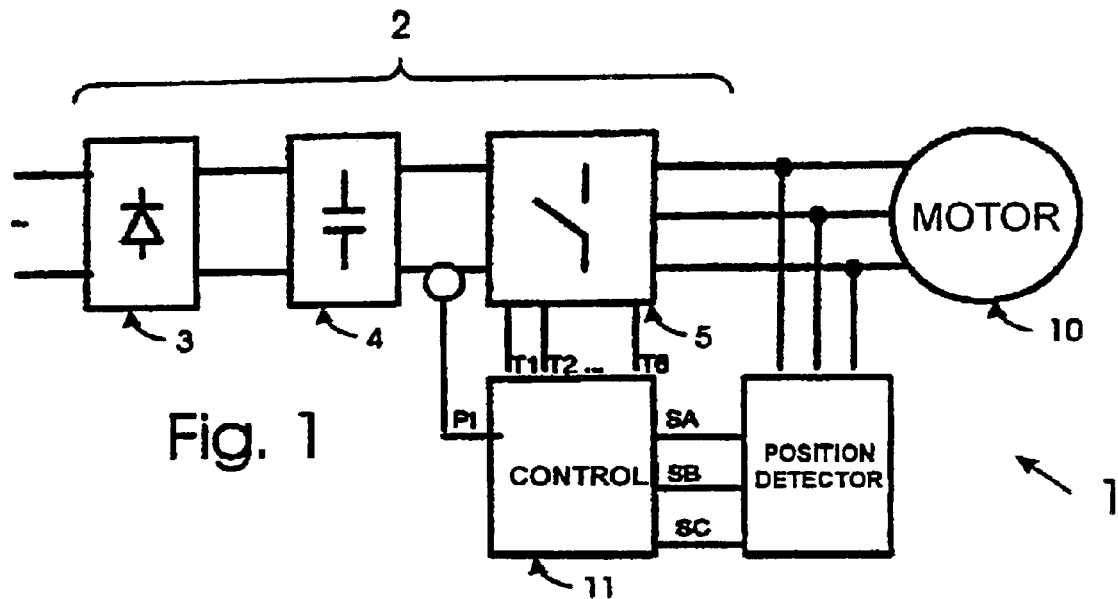
FIG. 1 represents a block diagram of an electric motor system electronically actuated by a control system.
Figure 2:
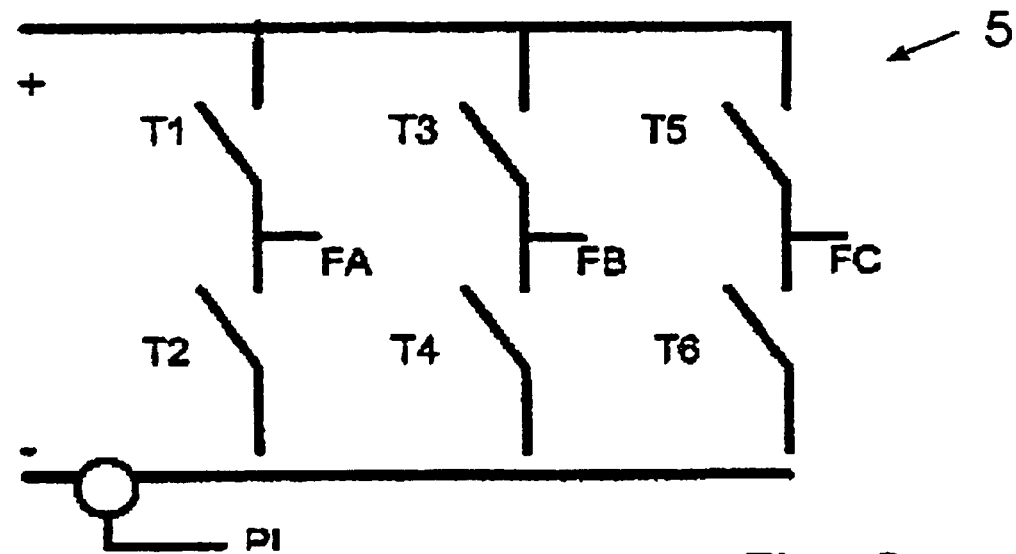
FIG. 2 is a schematic representation of a three-phase inverting bridge.

With reference to FIGS. 1 and 2, an electric motor system 1 is electronically actuated by a control system 2 comprising a rectifying bridge 3 basically, a capacitive filter 4, a three-phase inverting bridge 5, a three-phase motor provided with a permanent magnet rotor 10, a control unit 11, position detectors SA, SB and SC, and a current protection detector PI.

As known in the state of the art, the control unit 11 is responsible for the monitoring of the position detectors SA, SB and SC and the current protection detector PI in order to excite, through the respective outputs, the switches T1 through T6 of the three-phase inverting bridge 5 at a suitable time in accordance with the table illustrated in FIG. 3.

Thus, in response to the command of the control unit 11, the three-phase inverting bridge 5 will also apply a current to the coils of the motor 10 at the right time.

As already mentioned, in the event there is any failure in the position detectors SA, SB and SC, it is possible that one or more switches T1 through T6 of the three-phase inverting bridge 5 is not properly activated, what can generate high currents that are not detected by the current protection detector P1, resulting in the auto-demagnetization of the motor and damages to the switches T1 through T6 of the three-phase inverting bridge 5.

In accordance with the teachings of the present invention, the control system 2 also includes a microcontroller (not-shown) capable of analyzing the positions of the rotor as a function of the time, associated with a counter capable of carrying out successive steps of time counting. As known in the art, such counter may be an internal component of said microcontroller.

Said counter is set to zero whenever there is a change in the position of the rotor of the electric motor 10, the counting of a first period of time is started, during which period the rotor should be between a position and another one. Later on, the counting of a second period of time is started, during which time the rotor should pass through the next position.

In a three-phase motor with two poles there are six basic positions P1 through P6 of the rotor as shown in FIG. 3, which positions should be successively reached by the rotor during a respective second period of time.

If the rotor passes through one of the positions during said first period of time, what would be too early, or after said second period of time has elapsed, what would be too late, it means that there has been some error, and then said microcontroller turns off the control system 2 in order to prevent further damages, thus preserving the integrity of the rotor magnet and the switches of the three-phase inverting bridge.

If the rotor pass through the correct position during said second period of time, the microcontroller will issue an output updating signal and restart the counter, preparing same for counting the first and second periods of time corresponding to the next position where the rotor should pass through.

Of course, if the rotor, during said second period of time, passes through a position that is not the correct one, it also means that there has been some error, and then said microcontroller turns off the control system 2 by means of an error signal.

Figure 4:
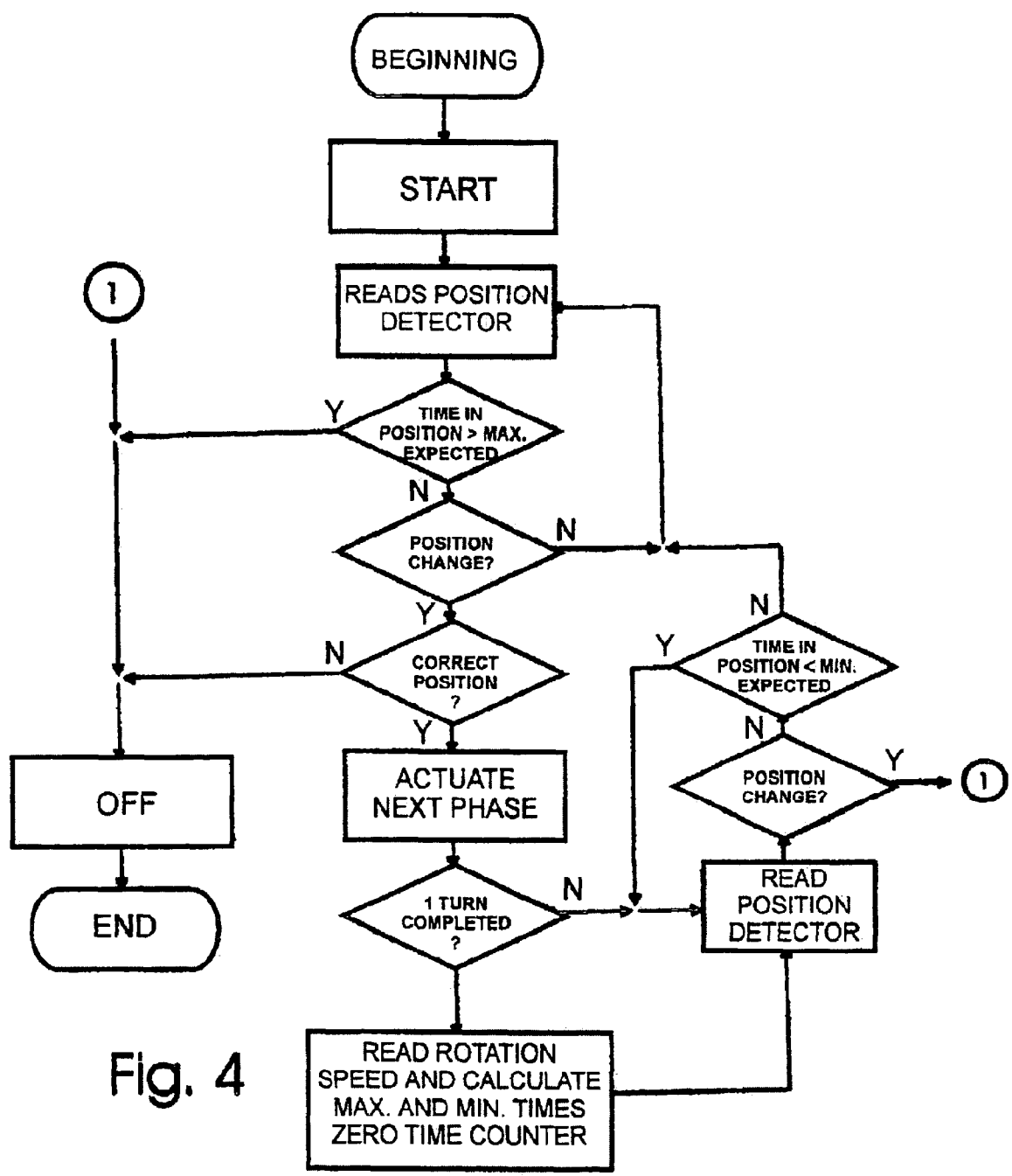
FIG. 4 is a generic flowchart of a method for controlling and protecting electric motors that incorporates the teachings of this invention.

FIG. 4 represents a generic flowchart of a method for controlling and protecting electric motors to exemplify the present invention.

As can be seen from this flowchart, after having started the rotor, the system will read the position detector and will be turned off if the time spent at the same position (also called as second period of time) is longer than the maximum time expected, said step being continuously repeated until a change in the position of the rotor is sensed, provided that the time spent at this instant position is not longer than the maximum expected time.

The next step, after the system has detected that the position of the rotor has been changed, is to evaluate if a correct position has been reached by the rotor, if not, the system will be turned of, and alternatively if the rotor is at the correct position, then the system will actuate the next phase of the motor.

After this step, the system will calculate if one complete turn of the rotor has been reached and, if it happens to be the case, the system will read the rotor's speed and calculate a new value for the minimum and maximum times, during which a change in the position of the rotor should take place. The counter will be reset afterwards.

If the rotor has not reached a complete turn, then the system will read the position detector and will turn off the control system if the position of the rotor has been changed; if this is not the case, the system will measure if the time spent on that certain position is shorter than the minimum expected time (also called as first period of time), if this is the case, the system will continuously repeat to read the position detector. If the time spent on that certain position is longer than the minimum expected time, than the system will return to the step of reading the position detector to monitor it the rotor has not spent a time at this position for a period of time longer than the maximum expected time (second period of time).

In accordance with the specific teachings of this invention, said second period of time should include a tolerance for the moment the rotor passes through a given position. As an example, in a three-phase motor with two poles rotating at 3,000 rpm, the rotor takes 20 ms to complete one turn, and thus it shall consume 3.3 ms for passing through each position.

In order to come up with said tolerance, said second period of time measured by the counter should include a first head range of 1.65 ms (x/2) and a second tail range of 6.6 ms (2x) beyond the regular 3.3 ms, what represents a tolerance of x-50% and x+100%.

After a preferred example of realization has been described, it should be understood that the scope of the present invention encompasses other possible variations, being limited only by the contents of the appended claims including the possible equivalents.

What is claimed is:

1. A control system for controlling and protecting electric motors provided with a rotor, specially permanent magnet motors electronically actuated by a control system, the electric motor comprising poles, the control system comprising position detectors detecting the position of the rotor with respect to the poles of the motor, the method comprising the steps of: continuously reading the position detector until a minimum expected time has passed and turning off the control system if a position change of the rotor is detected by the position detector, the minimum expected time being started to be counted from the passage of the rotor at a pole of the motor, after the minimum expected time has passed, continuously reading the position detector until a maximum expected time has passed and turning off the control system if a position change of the rotor is not detected by the position detector with the maximum expected time, the maximum expected time being subsequently counted after the minimum expected time has passed, if a position change is detected within the maximum expected time, measuring the position of the rotor and actuating the next phase of the motor if the position reached by the rotor is a previously predicted contact position, or turning off the system if the position reached by the rotor is not the previously predicted correct position;

measuring the position of the rotor to detect if one complete turn has been reached, and if a turn of the rotor has been completed, reading the rotation speed of the rotor and calculating a corrected value of the maximum and minimum expected time for the current speed and afterwards repeating the steps from the step of continuously reading the position detector until a minimum expected time has passed, or if a complete turn of the rotor has not been completed, repeat the steps from the step of continuously reading the position detector until a minimum expected time has passed.

2. The method according to claim 1, further comprising issuing an error signal:

if until the minimum expected time has passed, a position change of the rotor is detected by the position detector, and if after the maximum expected time has passed if no position change is detected by the position detector.

3. The method according to claim 2, wherein the maximum expected time has a tolerance of a first head range of half of its value and a second tail range of twice of its value.

4. A control system for an electric motor, especially a permanent magnet motor, the motor comprising poles and a rotor, the control system comprising a three-phase inverting bridge and position detectors detecting the position of the rotor with respect to the poles of the motor, the control system further comprising:

a microcontroller associated with the position detectors and further associated with a counter, the control system reading the position detectors until a minimum expected time has passed, the minimum expected time being counted by mm of the counter after the rotor has passed at a pole of the motor, the control system being turned off if a position change of the rotor is detected by the position detector within the minimum expected time, the control system continuously reading the position detector until a maximum expected time has passed and turning off the control system if a position change of the rotor is not detected by the position detector within the maximum expected time, the maximum expected time being counted by means of the counter and subsequently counted after the minimum expected time has passed, the control system comparing the position changes of the rotor with a previously predicted correct position, to be turned off if the position reached by the rotor is not a previously predicted correct position, the control system monitoring the position of the rotor to read the rotation speed of the rotor and calculating a corrected value of the maximum and minimum expected times for the current speed after a complete turn of the rotor has been completed.

5. The method in accordance with claim 4, wherein in that the control system is turned off through an error signal.

6. The control system according to claim 4, characterized in that the microcontroller issues an output updating signal to restart the counter after the rotor passes at a correct predicted position.

7. The control system according to claim 6, characterized in that the microcontroller issues an error signal to turn off the control system.

8. An electric motor system, comprising:

an electric motor with poles and a rotor; and a control system comprising a three-phase inverting bridge and position detectors detecting the position of the rotor with respect to the poles of the motor, the motor system additionally comprising:

a microcontroller associated with the position detectors and further associated with a counter, the control system reading the position detectors until a minimum expected time has passed, the minimum expected time being counted by means of the counter after the rotor has passed at a pole of the motor, the control system being turned off if a position change of the rotor is detected by the position detector within the minimum expected time, the control system continuously reading the position detector until a maximum expected time has passed and turning off the control system if a position change of the rotor is not detected by the position detector within the maximum expected time, the maximum expected time being counted by means of the counter and subsequently counted after the minimum expected time has passed, the control system comparing the position changes of the rotor with a previously predicted correct position, to be turned off if the position reached by the rotor is not a previously predicted correct position, the control system monitoring the position of the rotor to read the rotation speed of the rotor and calculate a corrected value of the maximum and minimum expected times for the current speed after a complete turn of the rotor has been completed.

9. The motor system according to claim 8, characterize in that the microcontroller issues an output updating signal to restart the counter after the rotor passes at a correct predicted position.

10. The motor system according to claim 9, characterized in that the microcontroller issues an error signal to turn off the control system.

11. A method for controlling and protecting an electric motor provided with a rotor, a permanent magnet, and a control system, comprising position detectors detecting the position of the rotor with respect to poles of the motor, comprising:

reading the position detector until a minimum expected time has passed and turning off the motor if a position change of the rotor is detected by the position detector within the minimum expected time, the minimum expected time being started based on passage of the rotor at a pole of the motor, after the minimum expected time has passed, reading the position detector until a maximum expected time has passed and turning off the motor if a position change of the rotor is not detected by the position detector within the maximum expected time, the maximum expected time being subsequently counted after the minimum expected time has passed, if a position change is detected within the maximum expected time, measuring the position of the rotor and actuating the next phase of the motor if the position reached by the rotor is a previously predicted correct position, or turning off the system if the position reached by the rotor is not the previously predicted correct position.

12. The method according to claim 11 further comprising:
measuring the position of the rotor to detect if one complete turn has been reached, and if a turn of the rotor has been completed, reading the rotation speed of the rotor and calculating a corrected value of the maximum and minimum expected times for the current speed and afterwards repeating the steps from the step of continuously reading the position detector until a minimum expected time has passed.

* * * * *